G. G. FRYER.
ANIMAL FEEDER.
APPLICATION FILED MAY 17, 1909.
964,906.
Patented July 19, 1910.
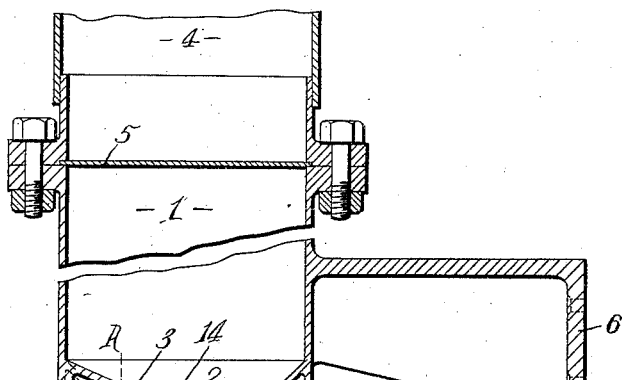
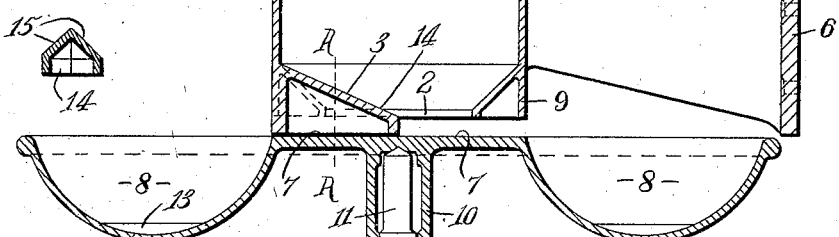
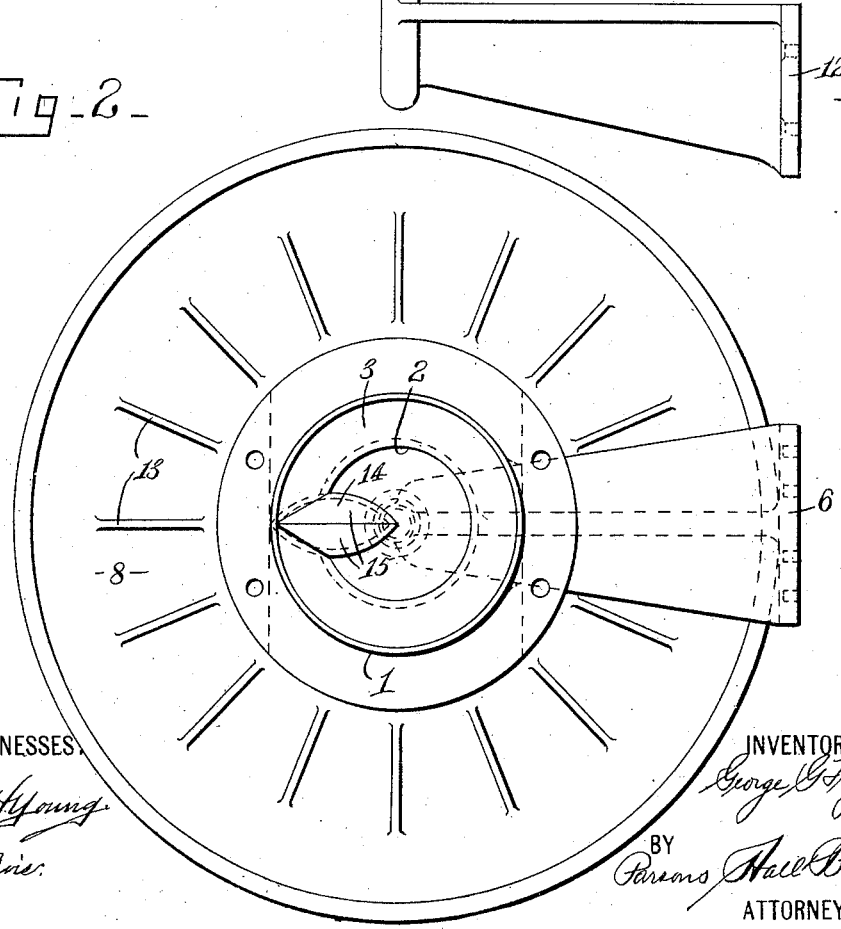
WITNESSES
INVENTOR
George G. Fryer
BY
Parsons Hall Bodell
ATTORNEYS

UNITED STATES PATENT OFFICE.

GEORGE G. FRYER, OF SYRACUSE, NEW YORK.

ANIMAL-FEEDER.

964,906.  Specification of Letters Patent.  Patented July 19, 1910.

Application filed May 17, 1909. Serial No. 496,412.

*To all whom it may concern:*

Be it known that I, GEORGE G. FRYER, of Syracuse, in the county of Onondaga and State of New York, have invented a certain new and useful Animal-Feeder, of which the following is a specification.

My invention has for its object the production of a particularly simple and efficient animal feeder; and it consists in the combinations and constructions hereinafter set forth and claimed.

In describing this invention reference is had to the accompanying drawing in which like characters designate corresponding parts in all the views.

Figure 1 is a vertical section of my animal feeder. Fig. 2 is a plan of parts seen in Fig. 1, parts being omitted. Fig. 3 is a section on line A—A, Fig. 1.

This animal feeder comprises a receptacle for the feed having an exit opening in its lower end, and a movable feed carrier arranged at the lower end of the receptacle in position to receive feed therefrom, the carrier being movable by the animal when obtaining feed.

As here shown the receptacle 1 is formed with an exit opening 2 in its bottom 3, and said bottom converges toward the exit opening 2. The receptacle 1 communicates at its upper end with a chute 4 connected to a supply box, not shown, and the flow of feed from the chute into the receptacle is controlled by a suitable valve, as the slide 5. The receptacle may be secured to a post, wall or other convenient structure in any suitable manner, here shown as by a bracket 6.

The feed carrier is movable about an axis, and comprises a table 7 arranged beneath and spaced apart from the bottom end of the receptacle 1 and a trough 8 carried at the outer edge of the table 7 and depending below the plane of said table in order that the feed when forced off the table, will fall into the trough. In order to prevent the feed from falling by gravity or from being forced by the pressure of the feed within the receptacle off the table and into the trough, the table 7 is of greater diameter than the opening 2, Fig. 1, and in order to prevent the animal from having access to the feed on the outer edge of the table, the sides of the receptacle are extended downwardly below the bottom 2 and terminate near the upper surface of the table forming shields 9. The table is here shown as formed with depending bearing 10 at its center for receiving a pivot or swivel pin 11, which is supported by a bracket 12 secured to the post or wall supporting the bracket 6. However the feed carrier may be supported in any desirable manner.

The trough 8 is preferably formed with crosswise or radial webs 13 at its bottom in order to facilitate the movement or rotation of the table by the animal. It will be understood that when the animal inserts his nose in the trough the movement of his lower jaw or lip in the act of obtaining a mouthful of feed rotates the carrier.

The feed in the receptacle falls downwardly upon the table 7 and is forced from the table into the trough during the rotation of the carrier, by a deflector 14 carried by the receptacle and extending below the lower edge thereof and terminating close to the table 7. As here shown, the deflector is formed with engaging faces 15 on opposite sides thereof in order that the feed will be forced into the trough when the table is rotating in either direction, and these faces 15 are preferably convex, and converge upwardly toward each other and meet in a line inclining downwardly toward the axis of the table 4, so that the feed can not lodge on the deflector. If desired the feed carrier may be locked from movement and unlocked at predetermined periods by time controlled mechanism.

My animal feeder is particularly advantageous as the amount of feed forced into the trough is controlled by the movement of the lower jaw and lip of the animal, in the act of obtaining a mouthful, and thus the animal cannot gulp or spill the feed as he cannot obtain large mouthfuls.

What I claim is:—

1. An animal feeder including a receptacle for the feed having an exit opening at its lower end, and a freely movable trough arranged to receive feed from said opening, the trough being movable by the animal in the act of obtaining a mouthful, substantially as and for the purpose described.

2. An animal feeder including a receptacle for the feed having an exit opening at its lower end, an annular freely rotatable trough at the lower end of the receptacle for receiving feed from the receptacle, the trough being movable about its axis by the animal when obtaining feed from the trough, substantially as and for the purpose specified.

3. An animal feeder including a receptacle for the feed having an exit opening in its bottom, and a freely rotatable feed carrier comprising a table arranged beneath said opening and spaced apart from the bottom end of the receptacle, and a trough supported at the outer edge of the table and arranged below the plane of the table, the carrier being movable about its axis by the animal when obtaining feed from the trough, substantially as and for the purpose set forth.

4. An animal feeder including a receptacle for the feed having an exit opening in its bottom, a rotatable carrier comprising a table arranged beneath said opening and spaced apart from the bottom end of the receptacle and a trough supported at the outer edge of the table and arranged below the plane of the table, the carrier being movable about its axis by the animal when obtaining feed from the trough, and means for forcing the feed from the table into the trough as the carrier rotates, the table being of greater diameter than the exit opening in order that the feed will not fall by gravity into the trough, substantially as and for the purpose described.

5. An animal feeder including a receptacle for the feed having an exit opening in its bottom, a rotatable feed carrier comprising a table arranged beneath said opening and spaced apart from the bottom end of the receptacle and a trough supported at the outer edge of the table and arranged below the plane of the table, the carrier being movable about its axis by the animal when obtaining feed from the trough, and means carried by the receptacle and extending from the outer edge thereof toward the axis of the table for forcing the feed off the table into the trough as the carrier rotates, substantially as and for the purpose specified.

6. An animal feeder including a receptacle for the feed having an exit opening in its bottom, a rotatable feed carrier comprising a table arranged beneath said opening and spaced apart from the bottom of the receptacle and a trough carried at the outer edge of the table and arranged below the plane of the table, the carrier being movable about its axis by the animal when obtaining feed from the trough, and means carried by the receptacle and extending from the edge of the receptacle toward the axis of the table for forcing feed off the table into the trough as the carrier rotates in either direction, substantially as and for the purpose set forth.

7. An animal feeder including a receptacle for the feed having an exit opening in its bottom, a rotatable feed carrier comprising a table arranged beneath the bottom end of the receptacle and spaced apart therefrom and a trough supported at the outer edge of the table and arranged below the plane of the table, the carrier being movable about its axis by the animal when obtaining feed from the trough, and a deflector fixed to the receptacle and extending from the outer edge of the receptacle toward the axis of the table, the deflector having engaging faces on opposite sides thereof for forcing feed off the table into the trough as the support rotates, substantially as and for the purpose described.

8. An animal feeder comprising a receptacle for the feed having an exit opening in its bottom, the inner walls of the receptacle converging toward the exit opening, a rotatable feed carrier comprising a table arranged beneath the bottom end of the receptacle and spaced apart therefrom and a trough supported at the outer edge of the table and arranged below the plane of the table, the carrier being movable about its axis by the animal when obtaining feed from the trough, and a deflector fixed to the receptacle and extending from the outer edge of the receptacle toward the axis of the table, the deflector having engaging faces on opposite sides thereof for forcing feed off the table into the trough as the support rotates in either direction, substantially as and for the purpose specified.

9. An animal feeder including a receptacle for the feed having an exit opening in its bottom, the inner walls of the receptacle converging toward the exit opening, a rotatable feed carrier comprising a table arranged beneath the bottom end of the receptacle and spaced apart therefrom and a trough supported at the outer edge of the table and arranged below the plane of the table, the carrier being movable about its axis by the animal when obtaining feed from the trough, and a deflector fixed to the receptacle and extending from the outer edge of the receptacle toward the axis of the carrier for forcing feed off the table into the trough as the carrier rotates, the table being of greater diameter than the exit opening in order that the feed will not fall by gravity into the trough, substantially as and for the purpose set forth.

10. An animal feeder including a receptacle for the feed having an exit opening in its bottom, a rotatable carrier comprising a table arranged beneath said opening and spaced apart from the bottom end of the receptacle and a trough supported at the outer edge of the table and arranged below the plane of the table, the carrier being movable about its axis by the animal when obtaining feed from the trough, means for forcing the feed from the table into the trough as the carrier rotates, the table being of greater diameter than the exit opening in order that the feed will not fall by gravity into the trough, and means for shielding the feed on the trough, substantially as and for the purpose described.

11. An animal feeder including a receptacle for the feed having an exit opening in its bottom, a rotatable carrier comprising a table arranged beneath said opening and spaced apart from the bottom end of the receptacle and a trough supported at the outer edge of the table and arranged below the plane of the table, the carrier being movable about its axis by the animal when obtaining feed from the trough, and means for forcing the feed from the table into the trough as the carrier rotates, the table being of greater diameter than the exit opening in order that the feed will not fall by gravity into the trough, and the sides of the receptacle being extended downwardly and terminating close to the table forming means for shielding the feed on the table, substantially as and for the purpose specified.

12. An animal feeder including a receptacle for the feed having an exit opening in its bottom, the inner walls of the receptacle converging toward the exit opening, a rotatable feed carrier comprising a table arranged beneath the bottom end of the receptacle and spaced apart therefrom and a trough supported at the outer edge of the table and arranged below the plane of the table, the carrier being movable about its axis by the animal when obtaining feed from the trough, a deflector fixed to the receptacle and extending from the outer edge of the receptacle toward the axis of the carrier for forcing the feed off the table into the trough as the carrier rotates, the table being of greater diameter than the exit opening in order that the feed will not fall by gravity into the trough, and means carried by the receptacle for shielding the feed on the table, substantially as and for the purpose set forth.

13. An animal feeder including a receptacle for the feed having an exit opening at its lower end, an annular rotatable trough at the lower end of the receptacle for receiving feed from the receptacle, the trough being movable about its axis by the animal when obtaining feed from the trough, a chute communicating with the upper end of the receptacle, and a valve for controlling the inlet of feed from the chute into the receptacle, substantially as and for the purpose described.

14. An animal feeder including a receptacle for the feed having an exit opening in its bottom, the inner walls of the receptacle converging toward the exit opening, a rotatable feed carrier comprising a table arranged beneath the bottom end of the receptacle and spaced apart therefrom, and a trough supported at the outer edge of the table and arranged below the plane of the table, the carrier being movable about its axis by the animal when obtaining feed from the trough, a deflector fixed to the receptacle and extending from the outer edge of the receptacle toward the axis of the carrier for forcing feed off the table into the trough as the carrier rotates, the table being of greater diameter than the exit opening in order that the feed will not fall by gravity into the trough, a chute communicating with the upper end of the receptacle, and a valve for controlling the flow of feed into the receptacle, substantially as and for the purpose specified.

15. An animal feeder including a receptacle for the feed having an exit opening in its bottom, a rotatable feed carrier comprising a table arranged beneath said opening and spaced apart from the bottom end of the receptacle and a trough carried at the outer edge of the table and arranged below the plane of the table, the carrier being movable about its axis by the animal when obtaining feed from the trough, and a deflector fixed to the receptacle and extending from the edge of the receptacle to the axis of the carrier for forcing feed off the table into the trough as the carrier rotates, said deflector having a convex face, substantially as and for the purpose set forth.

16. An animal feeder including a receptacle for the feed having an exit opening in its bottom, a rotatable feed carrier comprising a table arranged beneath said opening and spaced apart from the bottom end of the receptacle, and a trough carried at the outer edge of the table and arranged below the plane of the table, the carrier being movable about its axis by the animal when obtaining feed from the trough, and a deflector fixed to the receptacle and extending from the edge of the receptacle toward the axis of the carrier for forcing feed off the table into the trough as the carrier rotates, said deflector having convex engaging faces on opposite sides thereof, substantially as and for the purpose described.

17. An animal feeder including a receptacle for the feed having an exit opening in its bottom, a rotatable feed carrier comprising a table arranged beneath said opening and spaced apart from the bottom end of the receptacle and a trough carried at the outer edge of the table and arranged below the plane of the table, the carrier being movable about its axis by the animal when obtaining feed from the trough, and a deflector fixed to the receptacle and extending from the edge of the receptacle toward the axis of the carrier for forcing feed off the table into the trough as the carrier rotates, the sides of the deflector inclining upwardly toward each other and meeting in a line, substantially as and for the purpose specified.

18. An animal feeder including a receptacle for the feed having an exit opening in its bottom, a rotatable feed carrier comprising a table arranged beneath said opening and spaced apart from the bottom end of the receptacle and a trough carried at the outer edge of the table and arranged below the plane of the table, the carrier being movable about its axis by the animal when obtaining feed from the trough, and a deflector fixed to the receptacle and extending from the edge of the receptacle to the axis of the carrier for forcing feed off the table into the trough as the carrier rotates, said deflector having convex engaging faces on opposite sides thereof, the convex sides converging upwardly and meeting in a line, substantially as and for the purpose set forth.

19. An animal feeder including a receptacle for the feed having an exit opening in its bottom, the walls of the receptacle converging toward the exit opening, the rotatable feed carrier comprising a table arranged beneath the bottom end of the receptacle and spaced apart therefrom and a trough carried at the outer edge of the table and arranged below the plane of the table, the carrier being movable about its axis by the animal when obtaining feed from the trough, and a deflector fixed to the receptacle and extending from the outer edge of the receptacle toward the axis of the table for forcing feed off the table into the trough as the carrier rotates, the deflector having engaging faces on opposite sides thereof, said faces converging upwardly and meeting in a line inclining downwardly toward the axis of the table, substantially as and for the purpose described.

20. An animal feeder including a receptacle for the feed having an exit opening in its bottom, the walls of the receptacle converging toward the exit opening, a rotatable feed carrier comprising a table arranged beneath the bottom end of the receptable and spaced apart therefrom and a trough carried at the outer edge of the table and arranged below the plane of the table, the carrier being movable about its axis by the animal when obtaining feed from the trough, and a deflector fixed to the receptacle and extending from the outer edge of the receptacle toward the axis of the table, the deflector having engaging faces on opposite sides thereof in order to force feed off the table into the trough as the carrier rotates in either direction, the engaging faces converging upwardly and meeting in a line inclining downwardly toward the axis of the table, and said table being of greater diameter than the exit opening in order that the feed will not fall by gravity into the trough, means for shielding the feed on the table, a chute communicating with the upper end of the receptacle, and a valve for controlling the flow of feed from the chute into the receptacle, substantially as and for the purpose specified.

In testimony whereof, I have hereunto signed my name in the presence of two attesting witnesses, at Syracuse, in the county of Onondaga, in the State of New York, this 3rd day of April, 1909.

GEORGE G. FRYER.

Witnesses:
S. DAVIS,
FREDERIC G. BODELL.